United States Patent [19]
Sato

[11] Patent Number: 5,307,334
[45] Date of Patent: Apr. 26, 1994

[54] OPTICAL HEAD CLEANING CARTRIDGE

[75] Inventor: Kenichi Sato, Tokyo, Japan

[73] Assignee: TEAC Corporation, Japan

[21] Appl. No.: 874,618

[22] Filed: Apr. 27, 1992

[30] Foreign Application Priority Data

Apr. 30, 1991 [JP] Japan .................. 3-30250[U]

[51] Int. Cl.⁵ .............................................. G11B 3/58
[52] U.S. Cl. ......................................................... 369/71
[58] Field of Search .................. 369/71, 291; 360/133

[56] References Cited
FOREIGN PATENT DOCUMENTS

| | | | |
|---|---|---|---|
| 63-313378 | 12/1988 | Japan | 369/71 |
| 2-149987 | 6/1990 | Japan | 369/71 |
| 2-158975 | 6/1990 | Japan | 369/71 |
| 2-206079 | 8/1990 | Japan | 369/71 |
| 2-287988 | 11/1990 | Japan | 369/71 |

*Primary Examiner*—Stuart S. Levy
*Assistant Examiner*—David D. Davis
*Attorney, Agent, or Firm*—Andrus, Sceales, Starke & Sawall

[57] ABSTRACT

An optical head cleaning cartridge is adapted for use in an optical disk unit which includes an optical head located at a predetermined position in a specific operation mode of the optical disk unit and which uses the optical head to record information signals on and/or reproduce information signals from an optical disk which is accommodated within a standard type optical disk cartridge which is in conformance with a predetermined standard when loaded with the standard type optical disk cartridge. The optical head cleaning cartridge includes a case having a size and a shape which are approximately the same as those of the standard type optical disk cartridge, a cleaning element provided at a position of the case to confront the optical head when the optical head cleaning cartridge is loaded into the optical disk unit in the specific operation mode, and a manipulation part coupled to the cleaning element and located at a position of the case to allow manipulation. The cleaning element cleans the optical head by moving in response to a manipulation of the manipulation part.

11 Claims, 6 Drawing Sheets

OPTICAL HEAD CLEANING CARTRIDGE

BACKGROUND OF THE INVENTION

The present invention generally relates to optical head cleaning cartridges, and more particularly to an optical head cleaning cartridge which can clean an optical head of an optical disk unit by a simple operation.

An optical disk unit is provided with an optical head having an optical system which includes an objective lens, a prism and the like. Information signals are recorded on and/or reproduced from an optical disk by moving the optical head in a radial direction of the optical disk. The optical disk is accommodated within a protection cartridge, and the optical head scans the optical disk via a window which is provided in the cartridge.

The objective lens of the optical head confronts a recording surface of the optical disk and is exposed via an opening of the optical head. For this reason, dust or dirt inevitably adheres on the objective lens. If dust or dirt adheres on the objective lens, the recording and/or reproducing characteristic of the optical disk deteriorates.

Conventionally, when dust or dirt adheres on the objective lens, an outer cover of the optical disk unit is removed, and in some cases, circuit boards or the like are removed, to expose the objective lens. The surface of the exposed objective lens is cleaned by a cotton stick which holds alcohol or the like. After the surface of the objective lens is cleaned, the circuit boards or the like are mounted back to the original positions, and the outer cover is thereafter secured in place.

Accordingly, parts of the optical disk unit which are assembled in a complex manner with a high precision must conventionally be taken apart in order to clean the objective lens, and there is a problem in that the high-precision parts may be damaged during the taking apart or reassembling thereof. In addition, it is virtually impossible for the common user to carry out the above described cleaning of the objective lens, and there is a problem in that a serviceman (maintenance person) must make a trip to clean the objective lens. Furthermore, because the serviceman must make the trip to clean the objective lens, there also are problems in that considerable time, labor and cost are involved in the cleaning of the objective lens.

SUMMARY OF THE INVENTION

Accordingly, it is a general object of the present invention to provide a novel and useful optical head cleaning cartridge in which the problems described above are eliminated.

Another and more specific object of the present invention is to provide an optical head cleaning cartridge adapted for use in an optical disk unit which includes an optical head located at a predetermined position in a specific operation mode of the optical disk unit and which uses the optical head to record information signals on and/or reproduce information signals from an optical disk which is accommodated within a standard type optical disk cartridge which is in conformance with a predetermined standard when loaded with the standard type optical disk cartridge, comprising a case having a size and a shape which are approximately the same as those of the standard type optical disk cartridge, a cleaning element provided at a position of the case to confront the optical head when the optical head cleaning cartridge is loaded into the optical disk unit in the specific operation mode, and a manipulation part coupled to the cleaning element and located at a position of the case to allow manipulation, where the cleaning element cleans the optical head by moving in response to a manipulation of the manipulation part. According to the optical head cleaning cartridge of the present invention, it is possible to positively clean the optical head by a simple operation, and the optical head can be cleaned by the general user.

Other objects and further features of the present invention will be apparent from the following detailed description when read in conjunction with the accompanying drawings.

DESCRIPTION OF THE PREFERRED EMBODIMENTS

Figure 1:
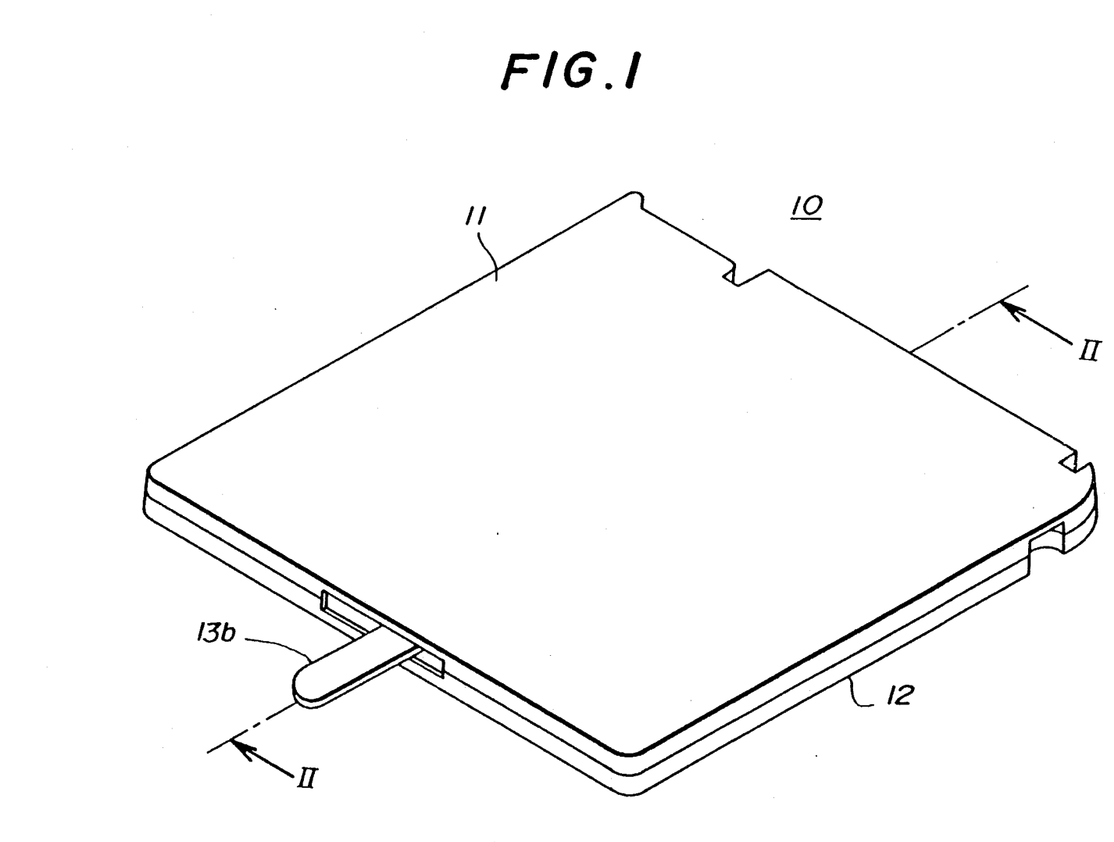
FIG. 1 is a perspective view showing an embodiment of an optical head cleaning cartridge according to the present invention.
Figure 2:
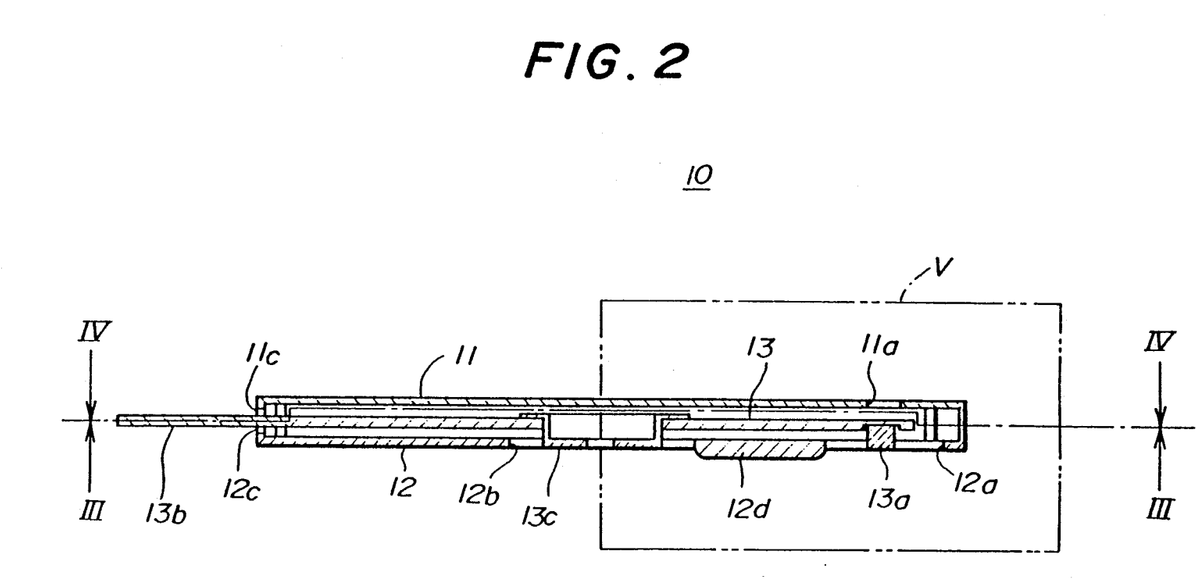
FIG. 2 is a vertical cross section showing the embodiment taken along a line II—II in FIG. 1.

FIG. 1 shows an embodiment of an optical head cleaning cartridge according to the present invention, and FIG. 2 shows a vertical cross section of the optical head cleaning cartridge taken along a line II—II in FIG. 1.

In FIGS. 1 and 2, an optical head cleaning cartridge 10 includes upper and lower cases 11 and 12, and an arm member 13 which is provided with a cleaning element 13a, a disk hub 13c and a manipulating lever 13b.

The upper and lower cases 11 and 12 are molded from a synthetic resin, for example, and adhered together so that the external size and shape of the cleaning cartridge 10 are approximately the same as those of a standard type optical disk cartridge which is in conformance with a predetermined standard. The cleaning cartridge 10 is inserted into and extracted from (loaded into and unloaded from) an optical disk unit 20 via a cartridge inserting opening, in the same manner as the insertion and extraction of the standard type optical disk cartridge relative to the optical disk unit 20 when recording or reproducing information signals on or from the optical disk which is accommodated within the standard type optical disk cartridge.

A circular opening 12a is formed in the lower case 12 at a part which confronts an objective lens of an optical head (not shown) of the optical disk unit 20 in a loaded position where the cleaning cartridge 10 is loaded into the optical disk unit 20. On the other hand, a circular opening 11a is formed in the upper case 11 at a part confronting the opening 12a, concentrically to the opening 12a. A circular opening 12b is formed in the lower case 12 at a part confronting a turntable of the optical disk unit 12 in the loaded position of the cleaning cartridge 10. In addition, cutouts 11c and 12c are respectively formed in the upper and lower cases 11 and 12 at a part confronting the cartridge inserting opening of the optical disk unit 20 in the loaded position of the cleaning cartridge 10. The cutouts 11c and 12c form an opening at a connecting part of the upper and lower cases 11 and 12. A projection 12d in the form of a circular column is formed on the lower case 12 between the openings 12a and 12b.

Figure 3:
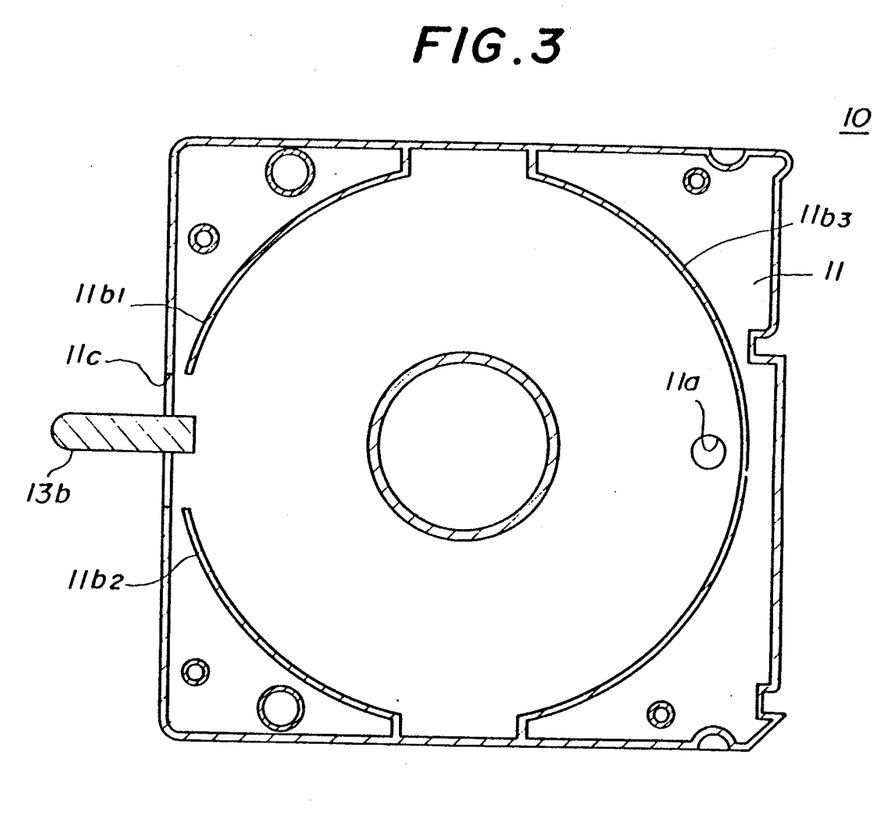
FIG. 3 is a horizontal cross section showing the embodiment taken along a line III—III in FIG. 2.
Figure 4:
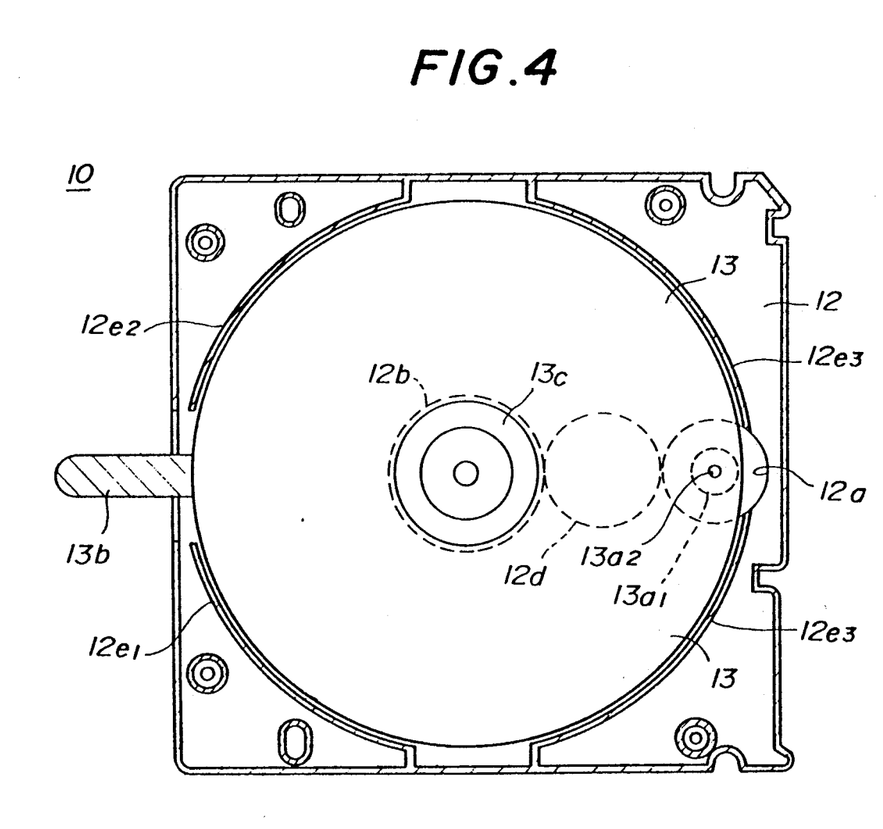
FIG. 4 is a horizontal cross section showing the embodiment taken along a line IV—IV in FIG. 2.

FIG. 3 shows a horizontal cross section along a line III—III in FIG. 2, and FIG. 4 shows a horizontal cross section along a line IV—IV in FIG. 2.

In FIG. 3, arcuate guide walls 11b through 11b3 project to the inside of the upper case 11. Similarly, arcuate guide walls 12e1 through 12e3 project to the inside of the lower case 12 as shown in FIG. 4.

The guide walls 12e1 through 12e3 connect to the respective guide walls 11b1 through 11b3 to form a ring-shaped guide wall which surrounds the arm member 13.

In this embodiment, the arm member 13 has a disk shape as shown in FIG. 4. If the cleaning cartridge has an external size and shape approximately the same as those of the standard type 3.5 inch optical disk cartridge, for example, the arm member 13 has a size and shape approximately the same as those of a 3.5-inch optical disk which is accommodated within the standard type 3.5 inch optical disk cartridge. The arm member 13 is rotatable about its center and is provided within a cylindrical chamber which is defined by the inner surfaces of the upper and lower cases 11 and 12 and the guide walls 11b1 through 11b3 and 12e1 through 12e3. A disk hub 13c which is provided at a central part of the arm member 13 has a shape approximately the same as that of a disk hub of the 3.5-inch optical disk. This disk hub 13c is exposed via the opening 12b of the lower case 12.

Figure 5:
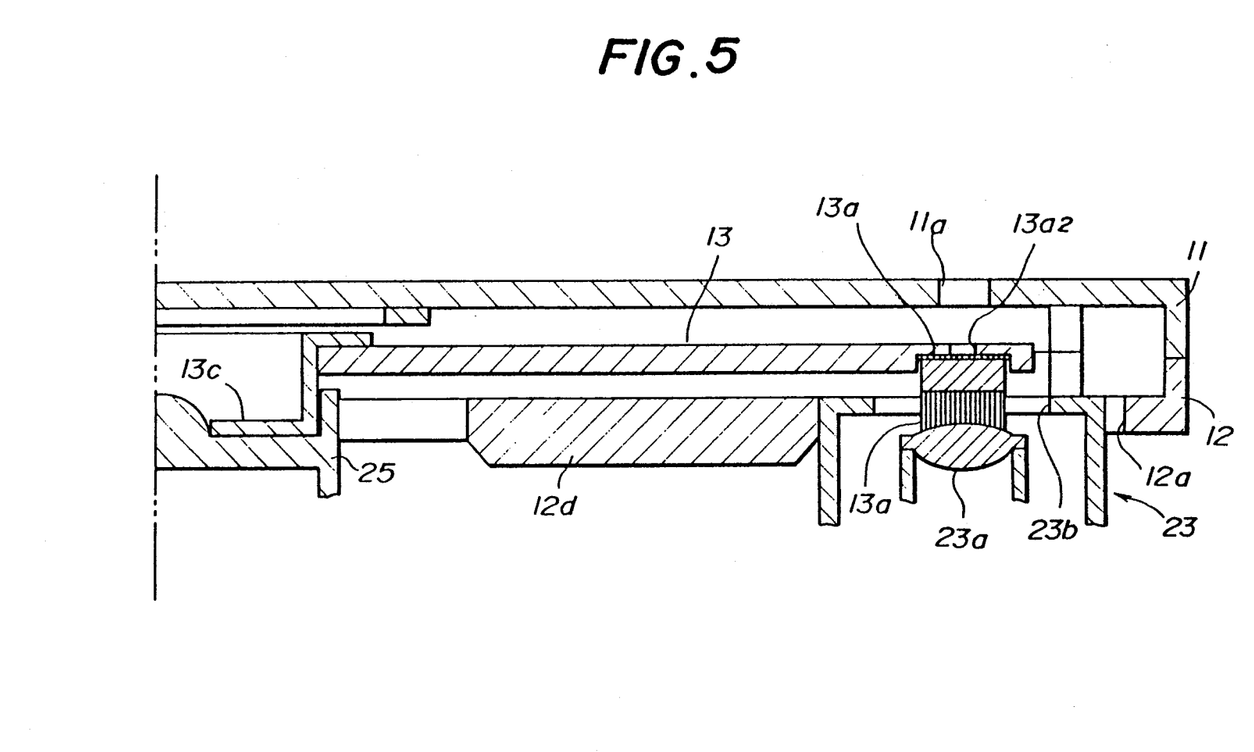
FIG. 5 is a cross sectional view showing a part surrounded by a line V in FIG. 2 on an enlarged scale.

FIG. 5 is an enlarged view of a part surrounded by a line V in FIG. 2, and shows the cleaning cartridge 10 in the loaded position within the optical disk unit 20. In FIG. 5, only the internal structures of the optical disk unit 20 related to the operation of the cleaning cartridge 10 are shown, and the illustration of other parts of the optical disk unit 20 is omitted.

In FIG. 5, the cleaning element 13a has a circular column shape, and the cleaning element 13a is detachably fixed to an outer peripheral part of the arm member 13 by a two-way adhesive tape 13a1, for example. The outer peripheral part of the arm member 13 where the cleaning element 13a is provided is on the outer side of an outermost periphery of the 3.5-inch optical disk. The tip end part of the cleaning element 13a is exposed via the opening 12a of the lower case 12. For example, the cleaning element 13a is made up of a sponge and cotton adhered thereto or, a soft brush. An opening 13a2 is formed in the arm member 13 at a central part of the mounting position of the cleaning element 13a. A manipulation lever 13b is provided on the arm member 13 at an opposite end about the center of the disk hub 13c from the position where the cleaning element 13a is mounted. This manipulation lever 13b is made up of a plate-shaped rod, and projects outside from the cartridge 10 via the opening which is formed by the cutouts 11c and 12c of the upper and lower cases 11 and 12.

Figure 6:
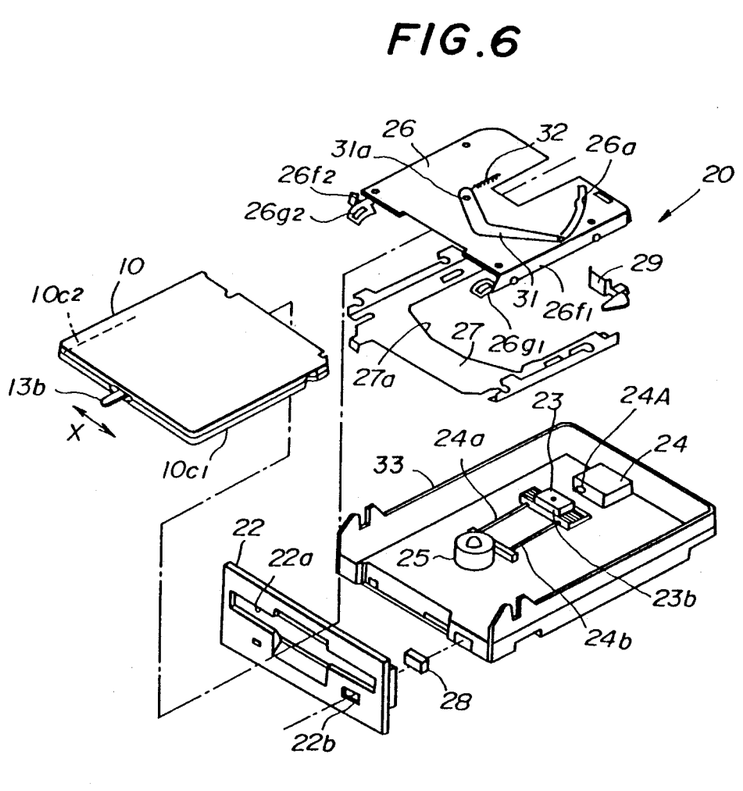
FIG. 6 is a disassembled perspective view showing an essential part of an optical disk unit to which the present invention is applied.

Next, a brief description will be given of the essential part of the optical disk unit 20, so as to explaining the operation of the cleaning cartridge 10. FIG. 6 is a disassembled perspective view of the optical disk unit 20. In FIG. 6, only the parts of the optical disk unit 20 required to explain the operation of the cleaning cartridge 10 are shown, and the illustration of the other parts is omitted.

In FIG. 6, the optical disk unit 20 generally includes a bezel 22, a frame 33, an optical processing part 24 and a turntable 25 which are fixed at predetermined positions within the frame 33, a holder 26, and a slide member 27. The optical disk unit 20 is also provided with an eject button 28, a lock lever 29 and the like.

A cartridge inserting opening 22a through which the standard type optical disk cartridge and the cleaning cartridge 10 are inserted and extracted, and an opening 22b through which a part of the eject button 28 projects to the outside, are formed in the bezel 22. This bezel 22 is fixed to the front surface part of the frame 33. The holder 26 is movable in the cartridge inserting and extracting directions and in up and down directions perpendicular to the cartridge inserting and extracting directions. A lever 31 is provided on the holder 26, and the holder 26 has an elongated hole 26a in which a pin provided on one end of the lever 31 slides. The other end of the lever 31 is connected to the end part of a tension coil spring 32, and the lever 31 is pivottable about a fulcrum 31a located in a vicinity of this other end of the lever 31.

The slide member 27 has an opening 27a, and is arranged so that the turntable 25 and the like are positioned inside the opening 27a. In addition, the slide member 27 is movable in the cartridge inserting and extracting directions. The turntable 25 and the optical head 23 are located within a space between the holder 26 and the slide member 27. The optical head 23 is guided by rails 24a and 24b, and is movable between the turntable 25 and the optical processing part 24. The optical head 23 includes optical system parts such as an objective lens and a prism. A laser beam emitted from a laser diode within the optical processing part 24 is irradiated via a beam splitter and a window 24A, and the optical path of the laser beam is changed by the prism within the optical head 23. The laser beam further travels through an objective lens 23a and an opening 23b of the optical head 23, and is converged in focus on the optical disk surface within the optical disk cartridge. The reflected beam from the optical disk surface passes through the objective lens 23a and the prism, and is supplied to the optical processing part 24 via the window 24A to be reproduced therein.

Next a description will be given of the operation of cleaning the optical head 23 of the optical disk unit 20.

First, the power source of the optical disk unit 20 is turned OFF, and the user inserts the cleaning cartridge 10 shown in FIG. 6 into the optical disk unit 20 via the cartridge inserting opening 22a. By this insertion of the cleaning cartridge 10, the pin at the tip end of the lever 31 which is provided on the holder 26 is engaged by the leading part of the cleaning cartridge 10, and the lever 31 pivots counterclockwise about the fulcrum 31a against the force exerted by the coil spring 32. In addition, the lock lever 29 is pushed by the leading part of the cleaning cartridge 10, and the holder 26 is moved downwardly by a known mechanism (not shown) in response to this pushing of the lock lever 29. As a result, the cleaning cartridge 10 moves downwardly together with the holder 26.

In this state, the optical head 23 enters the opening 12a in the lower case 12 of the cleaning cartridge 10 as shown in FIG. 5, and the tip end of the cleaning element 13a which is provided on the arm member 13 of the cleaning cartridge 10 makes contact with the objective lens 23a of the optical head 23 via the opening 23b of the optical head 23. At the same time, the disk hub 13c at the central part of the arm member 13 fits on the turntable 25, and the arm member 13 of the cleaning cartridge 10 is thus placed rotatably on the turntable 25.

Generally, the turntable 25 of the optical disk unit 20 is rotatable in the state where the power source of the optical disk unit 20 is turned OFF.

In this state, the manipulation lever 13b of the cleaning cartridge 10 projects outside of the optical disk unit 20 via the cartridge inserting opening 22a. If the manipulation lever 13b is manipulated in a direction X in FIG. 6, the movement of the manipulation lever 13b is transmitted to the cleaning element 13a via the arm member 13 which is rotatable about the center of the turntable 25. As a result, the cleaning element 13a moves in direction into and out of the paper in FIG. 5. Hence, the cleaning element 13a slides on the objective lens 23a of the optical head 23, and the lens surface of the objective lens 23a is cleaned.

If considerable dust or dirt is adhered on the lens surface of the objective lens 23, a cleaning liquid such as absolute alcohol may be applied to the cleaning element 13a during a first cleaning operation and a subsequent cleaning operation may be made using a dry new cleaning element 13a.

Normally, in the state where the power source of the optical disk unit 20 is turned OFF, the optical head 23 is located at a position which is on the outer side of the outermost periphery of the recording surface of the optical disk. For this reason, when the cleaning cartridge 10 is loaded into the optical disk unit 20 in the state where the power source is turned OFF, the cleaning element 13a of the cleaning cartridge 10 in the loaded position always confronts the objective lens 23a of the optical head 23 within the optical disk unit 20.

The projection 12d formed on the lower surface of the lower case 12 is provided at a position such that the projection 12d makes contact with the side surface of the cover of the optical head 23 when the cleaning cartridge 10 is in the loaded position. Therefore, even if the power source of the optical disk unit 20 is turned erroneously turned ON in the state where the cleaning cartridge 10 is in the loaded position, the projection 12d acts as a stopper and prevents the optical head 23 from moving to the inner periphery of the turntable 25, that is, to the left in FIG. 5.

When extracting the cleaning cartridge 10 from the optical disk unit 20, the eject button 28 shown in FIG. 6 is pushed. A known mechanism (not shown) raises the holder 26 in response to the pushing of the eject button 28. As a result, hook parts 26g1 and 26g2 respectively provided at the lower ends of side plates 26f1 and 26f2 of the holder 26 engage lower end parts 10c1 and 10c2 of the cleaning cartridge 10, and the rising holder 26 raises the cleaning cartridge 10. By this operation, the disk hub 13c separates from the turntable 25. Furthermore, the lock lever 29 pushes the cleaning cartridge 10 in the cartridge ejecting direction, and the cleaning cartridge 10 is ejected via the cartridge inserting opening 22a of the optical disk unit 20.

The arm member 13 need not have the disk shape as in the described embodiment, and may have an arbitrary shape so that the arm member 13 is rotatable about the disk hub 13c within the cleaning cartridge 10. For example, two fan-shaped members may be connected about the disk hub 13c, and in this case, the cleaning element 13a may be provided on one fan-shaped member and the manipulating lever 13b may be provided on the other fan-shaped member. In addition, the mechanism used to move the cleaning element 13a is of course not limited to that of the described embodiment. It is possible to provide a mechanism so that the cleaning element 13a rotates in response to the manipulation of the manipulation lever 13b.

In the embodiment described above, the cleaning cartridge 10 is inserted into the optical disk unit 20 to clean the optical head 23 in the state where the power source of the optical disk unit 20 is turned OFF. However, if the optical head 23 is located at a predetermined position during a specific operation mode of the optical disk unit 20, the position of the cleaning element 13a is selected so that the cleaning element 13a of the cleaning cartridge 10 in the loaded position confronts the optical head 23, and the position of the cleaning element 13a is not limited to that of the embodiment.

Further, the present invention is not limited to these embodiments, but various variations and modifications may be made without departing from the scope of the present invention.

What is claimed is:

1. An optical head cleaning cartridge adapted for use in an optical disk unit which includes an optical head located at a predetermined position in a specific operation mode of the optical disk unit and which includes a turntable, said optical disk unit using the optical head to record information signals on and/or reproduce information signals from an optical disk which is accommodated within a standard type optical disk cartridge which is in conformance with a predetermined standard and includes a hub which engages the turntable, said optical head cleaning cartridge comprising:

a case having a size and a shape which are approximately the same as those of the optical disk cartridge and having a hub at a position corresponding to the hub of the optical disk cartridge, said case being formed with a first opening confronting the optical head and a second opening confronting the turntable, said case further having a stopper projection formed thereon between the first opening and the second opening, said stopper projection engageable with said optical head and preventing movement of said optical head toward the turntable when said optical head cleaning cartridge is in use in said optical disk unit;

a cleaning element provided at a position of said case to confront the optical head when the optical head cleaning cartridge is loaded into the optical disk unit in the specific operation mode;

a transmitting mechanism; and a manipulation part coupled to said cleaning element via said transmitting mechanism, said manipulation part projecting outside said case and being located at a position of said case to allow manipulation, said manipulation part being pivotable about the hub of said case, said cleaning element cleaning the optical head by moving in response to a manipulation of said pivotable manipulation part.

2. The optical head cleaning cartridge as claimed in claim 1, wherein said case includes an opening, and said cleaning element makes contact with the optical head via said opening.

3. The optical head cleaning cartridge as claimed in claim 1, wherein said case includes an opening, and said manipulation part projects outside said case via said opening.

4. The optical head cleaning cartridge as claimed in claim 1, wherein the optical head of the optical head unit includes an objective lens which is exposed, and said cleaning element cleans the objective lens of the optical head.

5. The optical head cleaning cartridge as claimed in claim 1, wherein said cleaning element is made of a soft material selected from a group comprised of sponge, cotton and brush.

6. The optical head cleaning cartridge as claimed in claim 1, wherein said specific operation mode is a mode in which a power source of the optical disk unit is OFF.

7. The optical head cleaning cartridge as claimed in claim 1, wherein the optical head includes a lens with an optical axis, and said cleaning element rotates about an axis which is approximately parallel to the optical axis in response to a manipulation of the pivoted manipulation part.

8. The optical head cleaning cartridge as claimed in claim 7, wherein said cleaning element has a circular shape with a radius which is at least approximately the same as that of the lens of the optical head.

9. The optical head cleaning cartridge as claimed in claim 1, wherein said transmitting mechanism includes a rotatable member which is rotatable about the hub of said case and rotationally drives said cleaning element.

10. The optical head cleaning cartridge as claimed in claim 9, wherein said manipulation part and said rotatable member are integrally formed.

11. The optical head cleaning cartridge as claimed in claim 1, wherein said transmitting mechanism includes a rotatable arm having a hub engageable with said turntable.

* * * * *

UNITED STATES PATENT AND TRADEMARK OFFICE
CERTIFICATE OF CORRECTION

PATENT NO. : 5,307,334
DATED : April 26, 1994
INVENTOR(S) : Sato

It is certified that error appears in the above-indentified patent and that said Letters Patent is hereby corrected as shown below:

CLAIM 1, Col. 6, Line 34, delete "standard type"; CLAIM 1, Col. 6, Line 35, delete "which is in conformance with a predetermined standard"

Signed and Sealed this

Sixth Day of September, 1994

Attest:

BRUCE LEHMAN

Attesting Officer

Commissioner of Patents and Trademarks